United States Patent [19]

Deckers et al.

[11] Patent Number: 4,515,470
[45] Date of Patent: May 7, 1985

[54] APPARATUS FOR EXPOSING AND THEN SEPARATING SUPERPOSED ORIGINAL AND LIGHT-SENSITIVE SHEETS

[75] Inventors: Albert T. Deckers, Maasbree; Arie Leppink, Venlo, both of Netherlands

[73] Assignee: Océ-Nederland B.V., Venlo, Netherlands

[21] Appl. No.: 534,742

[22] Filed: Sep. 22, 1983

[30] Foreign Application Priority Data

Oct. 18, 1982 [NL] Netherlands .................. 8204012

[51] Int. Cl.[3] .................................... G03B 17/24
[52] U.S. Cl. .............................. 355/105; 355/110; 271/284
[58] Field of Search ........... 355/105, 108, 110, 117; 271/283, 284, 195, 176

[56] References Cited

U.S. PATENT DOCUMENTS

| | | | |
|---|---|---|---|
| 3,138,374 | 6/1964 | Newlin | 271/74 |
| 3,161,121 | 12/1964 | Linthout | 95/77.5 |
| 3,419,328 | 12/1968 | Klosky et al. | 355/110 |
| 3,947,020 | 3/1976 | Kobayashi | 271/172 |

FOREIGN PATENT DOCUMENTS 915885  1/1963  United Kingdom .

Primary Examiner—John Gonzales
Assistant Examiner—Brian W. Brown
Attorney, Agent, or Firm—Albert C. Johnston

[57] ABSTRACT

An apparatus, such as in a copying machine, by which an original sheet and a light-sensitive sheet can be fed along separate feed paths toward and onto one another and then one upon another through a station for exposure of the light-sensitive sheet to a light image of the original sheet is provided with a control system, including a separating device disposed to act on the sheets passing from the exposure station, whereby after an exposure the original sheet can be led away from the light-sensitive sheet irrespective of the relative position of the sheets fed for the exposure. A detector sensing the leading edge of an original sheet in its own feed path, activates the control system which in turn puts the separating device into operation after the lapse of a period of time corresponding to the time of transport of the leading edge of the original sheet from the detector up to the separating device. The separating device is de-activated, as by another detector disposed in a sheet discharge path, when the leading portion of the separated original sheet passes out of the range of action of the separating device.

6 Claims, 1 Drawing Figure

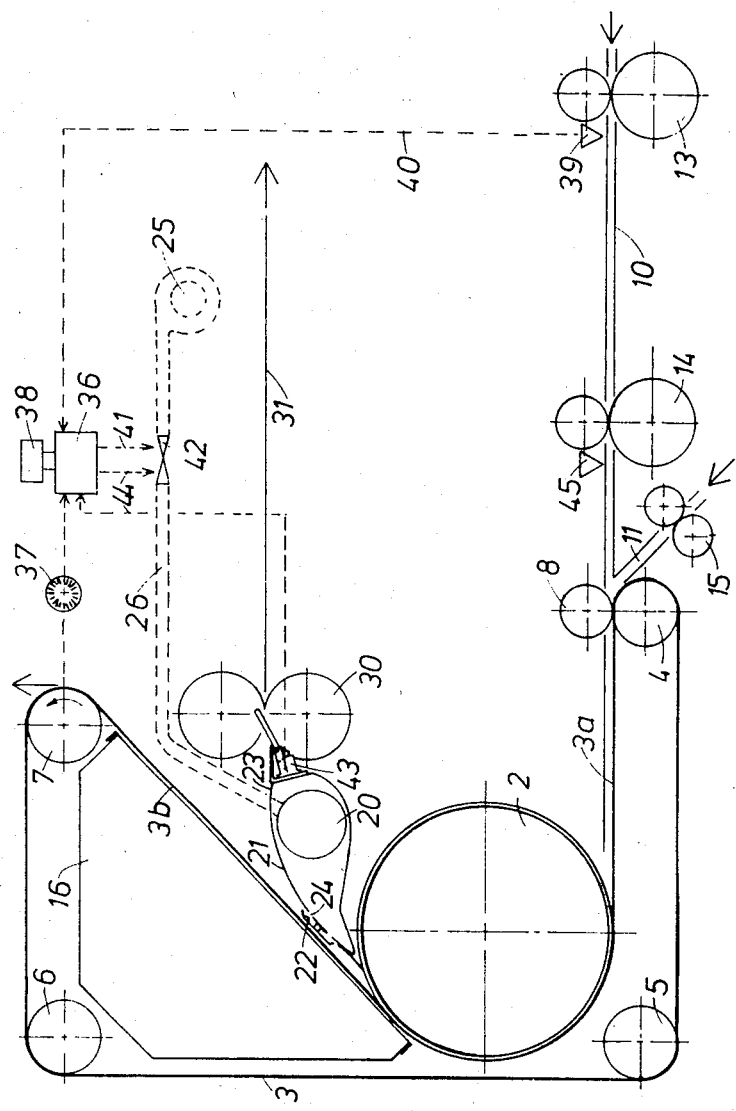

APPARATUS FOR EXPOSING AND THEN SEPARATING SUPERPOSED ORIGINAL AND LIGHT-SENSITIVE SHEETS

This invention relates to an exposure apparatus of a kind to be utilized, for example, in a copying machine such as a diazotype apparatus for exposing to light and thereafter separating superposed original and light-sensitive sheets.

The exposure in such an apparatus is effected by feeding an original sheet and a light-sensitive sheet in separate feed paths toward and onto one another, and then in a common path through an exposure station where the light-sensitive sheet is exposed to a light image of the original.

Many forms of apparatus of the kind mentioned are known. The apparatus required in given situations will depend upon the type of copies required. Among the conditions which occur to be met in carrying out the contact exposures are that: (1) the original sheet and the light-sensitive copying sheet are positioned one upon the other so that the two sheets exactly cover one another; or (2) the original sheet projects beyond the copying sheet (this, for example, is the case when the original is provided with a reinforcement or suspension strip that is not to be reproduced on the copy); or (3) the copying sheet projects beyond the original sheet (as is the case, for example, when the copy is to be produced with an unimaged edge strip useful for binding or filing the copy).

The known forms of such exposure apparatus usually operate reliably when the leading edges of the superposed sheets are positioned exactly on one another upon being passed through the exposure station. They also will operate reliably if, upon reaching a separator disposed beyond the exposure station, the leading edge of the sheet to be led away by the separator projects ahead of the other sheet.

The operation, however, becomes unreliable when the sheet that is not to be led away by the separator projects ahead of the sheet that is to be so led away. In such cases the separator may act on the projecting portion of the leading sheet so as to lead that sheet away from its intended path, thus causing the two sheets to be led away in the same direction so that no separation of them is effected.

Proposals have been made, for instance as disclosed in U.S. Pat. No. 3,138,374, to make the sheet separating operation more reliable by providing between the exposure station and the separator a detector which, upon sensing a packet of sheets passing from the exposure station, activates the separator so that it will operate when the sheet that is to be led away comes into its range of separating action. Such a facility will enable reliable separation of the sheets if the time of activation of the separator is adjusted each time to suit each variation of the relative positions of the sheets to be separated. The separator, however, will operate very unreliably if the sheets, either intentionally or unintentionally, occupy a relative position different from that for which the apparatus is adjusted.

The principal object of the present invention is to provide an apparatus for separating superposed original and light-sensitive sheets after each exposure, which will operate reliably for all the expectable conditions of relative positioning of the sheets, and without requiring a resetting or adjustment of the apparatus to adapt it to a variation of the sheet positions.

This object is achieved according to the invention by an apparatus of the kind above mentioned which includes an exposure station, transport means for feeding an original sheet and a light-sensitive sheet, each in its own feed path, toward and then onto one another and then feeding the sheets one upon another in a path through the exposure station, and means beyond the exposure station for leading one of the sheets away from the other sheet and thus separating the sheets automatically. Further according to this invention, however, the apparatus comprises in the combination a detector means for sensing and for delivering a signal upon the movement past a certain location in its own feed path of a sheet that is to be led away by the sheet separating means, and means are provided which in response to the said signal will activate the separating means after a time delay that is equal to the period of time required for the transport means to feed up to the sheet separating means the leading edge of a sheet that has been sensed by the detector means.

In an apparatus as provided by the present invention, irrespective of the relative positions of the sheets being fed for an exposure, the sheet separating means will become active at a time when the leading edge of the sheet that is to be led away comes into its range of operation. Reliable separation of the sheets is thus assured in every circumstance.

The means for activating the sheet separating means after a time delay may comprise a device known per se for the delayed transmission of signals, or a time switch. The extent of the delay in activating the separating means of course must be adapted to the speed of transport of the sheets through the exposure apparatus. If the apparatus is one in which the transport speed is variable in order to regulate the exposure, the time delay means to be used is also adjustable to enable exact adaptation of the time delay to the distance of travel of the sensed sheet that is to be led away. The required adaptation can easily be maintained automatically by suitably coupling the means by which the transport speed is varied with a means for adjusting the time delay means.

In an advantageous embodiment of the invention, an automatic adaptation of the time delay to the transport speed is obtained by utilizing as the time delay means a pulse generator coupled for movement synchronously with the sheet transport means and a pulse counter which, upon being started by a signal from the above-mentioned detector means, counts the pulses generated by the pulse generator and when a preset number of them is counted delivers a signal for activating the sheet separating means.

According to a further feature of the invention, the apparatus is provided with a switching means which will function to de-activate the separating means when the leading edge of a separated sheet passes out of the range of action of the separating means. For this purpose, preferably, a second detector means is disposed in the path of travel of the separated sheet so that this detector means will deliver a signal for de-activating the separating means in response to the passing of the leading edge of that sheet. Consequently, the sheet separating means is active only in the period during which a sheet separation is being effected with the leading portion of a sheet located within the range of action of the separating means. In this way, the duration of a possibly annoying noise usually associated with the pneumatic separation of sheets is minimized.

Other objects, features and advantages of the invention will be apparent from the following description and the accompanying drawings of a preferred embodiment of the invention.

The drawing is a schematic sectional view of an apparatus embodying the invention.

The apparatus represented in the drawing comprises a rotatable exposure cylinder 2 containing a light source (not shown). An endless sheet transport conveyor 3 comprises a plurality of belts which are spaced apart in side by side relation and positioned by guide rollers 4, 5, 6 and 7 so as to be trained about the cylinder 2. One of the guide rollers, such as roller 7, is rotatable in the direction indicated by the arrow in order to drive the belts and hence the cylinder 2 at the peripheral speed of roller 7. An adjustable drive means (not shown) for the driven roller 7 enables adjustment of the transport speed of the belts and the cylinder.

The belts of conveyor 3 run from guide roller 4 to the cylinder 2 in a substantially horizontal belt flight 3a which at roller 4 forms a nip with pressure roller 8. Separate sheet transport paths 10 and 11 are provided along which an original sheet to be copied and a light-sensitive sheet, respectively, can be moved toward one another so as to be positioned one upon the other in the nip at roller 8 and then to be transported together to and about the cylinder 2 while being pressed against the cylinder 2 by the belts. Pairs 13 and 14 of sheet transport rollers in the feed path 10 and a pair 15 of sheet transport rollers in the feed path 11 are driven at the same speeds as the driven guide roller 7.

A flight 3b of the belts of conveyor 3, which extends from the cylinder 2 to the guide roller 7, has a suction box 16 disposed over it and formed with openings located at spaces between the belts so that a continuous suction is applied through the suction box to a sheet in contact with the belts in flight 3b.

A sheet separating device of a type known per se, such for instance as the device disclosed in U.S. Pat. No. 2,441,912, which operates pneumatically by the so called Bernouilli effect, is provided at the under side of the belts in flight 3b at a location near the cylinder 2. The separating device comprises a tubular member 20 having a wall 21 that faces the belts in flight 3b and slopes away from them tangentially in the direction of the belt movement, from a wall portion 22 that lies close and parallel to the belts to a wall portion 23 projecting at an angle of about 45° relative to the belt flight 3b. The wall portion 22 of member 20 is provided with a plurality of apertures 24 through which streams of air will flow when air is supplied into member 20 from a blower 25 via a duct 26. The air supply duct 26 is connected to the opposite ends of the tubular member 20 via two distributing ducts (not shown). The air supply duct 26 contains a valve 42 which when closed prevents air from being blown through the apertures 24. When the exposure apparatus is switched on and ready for use, the blower 25 is energized so that its fan rotates continuously, but the valve 42 is closed and no air flows through member 20.

The apertures 24 in wall portion 22 of the tubular member 20 are disposed so that the air streams which pass through them when the valve 42 is open flow in the direction of movement of the belts and then along the surface of wall 21, thus creating a partial vacuum in the space between the wall 21 and the belt flight 3b. This reduced pressure, or vacuum, condition functions to lead away from the belts and along the wall 21 the leading edge of a sheet that is superposed on another sheet and being passed beyond the apertures 24 in the direction of movement of belt flight 3b.

The projecting wall portion 23 of the tubular member 20 leads a sheet drawn away from the path of the belt flight 3b up to the nip of a pair 30 of sheet transport rollers by which the sheet then is fed into a discharge path 31.

A control unit 36 is provided for controlling the operation of the sheet separating device. A pulse disc 37 is coupled and rotates in synchronism with the driven guide roller 7. A pulse counter 38 connected with control unit 36 receives and can count the number of pulses emitted by the rotating pulse disc 37. A detector 39 disposed at the feed path 10 for the original sheets senses the leading edge of an original introduced for exposure and then delivers to the control unit 36 via line 40 a signal which causes the counter 38 to start a count of the pulses emitted by the pulse disc 37. The pulse counter 38 can be set to count a number of pulses representative of the distance of travel of an original from the location of the detector 39 to the location of the apertures 24 in the tubular member 20 of the sheet separating device.

When the set number of pulses is counted, the counter 38 delivers a signal along line 41, which causes the valve 42 in the air supply duct 26 to open. The control unit 36 contains means known per se which stop the count when the counter 38 has reached the set number, and prepare the counter for the next count.

Near the wall portion 23 of member 20, which leads to the discharge path 31, a detector 43 is provided which senses the movement of the leading edge of an original when the original is being engaged by the rollers 30 and then delivers a signal along line 44 to close the valve 42. In an alternative arrangement, instead of employing a sheet detector as indicated at 43, the control unit 36 can be set so that the counter 38, after reaching the pulse count set for opening the valve 42, will continue to count a second preset number of pulses corresponding to the distance of travel of the leading edge of an original from the location of the apertures 24 to the nip of the rollers 30 and when the second set number of pulses is counted, will deliver a signal for closing the valve 42.

The feed path 10 for the originals also contains a second detector 45 which senses the leading edge of an original moving in path 10 and thereupon starts the movement of a light-sensitive sheet toward the exposure cylinder 2 as will be explained further hereinbelow.

The operation of the apparatus illustrated in the drawing will now be described with reference to a number of situations which occur in the practical use of contact exposure devices. It is assumed that, as is usual in the operation of such devices, a light-sensitive sheet is in a position of readiness at the nip between the rollers 15. If then an original sheet is introduced into the path 10 and advanced along it by the rollers 13 and 14, the leading edge of this sheet will pass detector 45 which, in response, issues a signal that starts the rollers 15 in rotation. The light-sensitive sheet then is advanced along path 11, and the original and light-sensitive sheets are placed one upon the other in the nip between the rollers 4 and 8. Depending upon the location of the detector 45, which can be made displaceable to different locations along the path of advance of the original sheet, the two sheets can be placed one upon the other in any desired relative position.

If an original sheet to be exposed is, for example, one having a 70 mm suspension strip on an end of the sheet, which strip is not to be imaged, then as indicated hereinbefore, in order to achieve the required conveyance of the sheets in offset relation, the feeding of the light-sensitive sheet via path 11 toward the nip at roller 8 will accordingly be started later than otherwise would be the case in relation to the feeding of the original sheet via path 10. When the leading edge of such an original sheet passes the detector 39, the resulting signal on line 40 initiates a pulse count by oounter 38. Then, when that leading edge has passed through the exposure station at cylinder 2 and reached the apertures 24, the pulse count will have reached a preset value and caused a signal 41 to open valve 42 so that air starts to flow out via the apertures 24 in streams directed along the surface of wall 21. As a result, the leading portion of the original is drawn away from the path of the belt flight 3b in a flowing movement and is led away over the wall 21.

The exposed light-sensitive sheet, which is drawn against the belt flight 3b by the suction of box 16, continues on its way to a developing apparatus (not shown). Meanwhile, the leading edge of the original is engaged by the rollers 30 and meets the detector 43, causing the air flow to be shut off again with de-activaction of th separating device immediately after the separation of the original has taken place. Air vibrations or fluttering of the separated sheet, which might cause annoying noise, are thus minimized.

If the copy is required to have an edge bearing no information, such for example as a 30 mm edge for punch holes, the feeding of the light-sensitive sheets via path 11 is effected so that the leading edge of the light-sensitive sheet reaches the nip between the roller 8 and the belts on roller 4 ahead of the leading edge of the original. In this case, a separating air flow is correspondingly produced at the apertures 24 when the leading edge of the original comes within the range of action of the separating device. This air flow cannot act on the now-leading light-sensitive sheet, because the airflow is not produced until the leading edge of the original reaches the location of the air flow at the apertures 24. It results that the light-sensitive sheet will follow its path to a developing apparatus (not shown) in the normal way, yet the original sheet will still be separated reliably when its leading edge reaches the range, or zone, of action of the separating device. Here too, the separating device is de-activated immediately after the sheet separation has taken place.

It will be apparent that the control unit 36 can be arranged to operate with a plurality of counters similar to the counter 38, so that when original sheets are introduced consecutively into the feed path 10 each sheet following another can initiate a pulse count of its own by another counter. In this way, the separating device can continue to operate reliably if a subsequent original is introduced while the preceeding original has not yet been separated. This may be desirable particularly for copying short originals introduced rapidly one after another.

While the illustrated emodiment of the invention makes use of a sheet separating device of the pneumatic type, it will be evident that the invention can also be carried out with the use of separating devices of other types, such for example, as sheet separators that work by friction.

We claim:

1. In an apparatus for exposing to light and thereafter separating superposed original and light-sensitive sheets, including an exposure station, transport means for feeding an original sheet and a light-sensitive sheet, each in its own separate feed path, toward and then onto one another and then feeding said sheets one upon the other in a path through the exposure station, and means beyond the exposure station for leading one of said sheets away from the other sheet and thus separating the sheets automatically, the combination which comprises detector means for sensing and for delivering a signal upon the movement, past a certain location in its own feed path, of a said sheet that is to be led away by said separating means and means responsive to said signal to activate said separating means after a time delay equal to the period of time required for said transport means to feed up to said separating means the leading edge of a sheet sensed by said detector means.

2. Apparatus according to claim 1, said signal responsive means comprising a pulse generator coupled for movement synchronously with said transport means and a pulse counter which in response to said signal counts the pulses generated by said generator and, when a preset number of them is counted, delivers a signal for activating said separating means.

3. Apparatus according to claim 1 or 2, which further comprises switching means operated to de-activate said separating means when a said leading edge leaves the range of action of said separating means.

4. Apparatus according to claim 3, said switching means comprising a detector disposed in the path of a said sheet led away by said separating means, said detector being responsive to movement of the leading edge of such a sheet to deliver a signal that de-activates said separating means.

5. Apparatus according to claim 1 or 2, said separating means comprising a member operative pneumatically by creating a reduced air pressure at the side of said sheets facing said member, said apparatus including an air pump connectable to said member via an air duct containing a valve, said signal responsive means being operative to open said valve and thus activate said separating means.

6. Apparatus according to claim 5, further comprising means for closing said valve and thus de-activating said separating means upon movement of the leading edge of a sheet led away by said separating means out of the range of action of said separating means.

* * * * *